(12) United States Patent
Premkrishna et al.

(10) Patent No.: US 12,493,479 B2
(45) Date of Patent: *Dec. 9, 2025

(54) SYSTEMS AND METHODS FOR GENERATING A COHESIVE USER EXPERIENCE USING MICRO FRONTEND FRAGMENTS WITHOUT USE OF A SHELL APPLICATION

(71) Applicant: Capital One Services, LLC, McLean, VA (US)

(72) Inventors: Naveena Premkrishna, Livermore, CA (US); Brian Sunter, San Francisco, CA (US); Naveen Chandran, San Ramon, CA (US); Jesus Rocha Guerrero, Hollister, CA (US); Sumod Soman, San Ramon, CA (US)

(73) Assignee: Capital One Services, LLC, McLean, VA (US)

( * ) Notice: Subject to any disclaimer, the term of this patent is extended or adjusted under 35 U.S.C. 154(b) by 355 days.

This patent is subject to a terminal disclaimer.

(21) Appl. No.: 18/182,307

(22) Filed: Mar. 10, 2023

(65) Prior Publication Data

US 2024/0303094 A1 Sep. 12, 2024

(51) Int. Cl.
*G06F 9/451* (2018.01)
*G06F 9/4401* (2018.01)
*G06F 9/54* (2006.01)
*G06F 21/44* (2013.01)

(52) U.S. Cl.
CPC .......... *G06F 9/451* (2018.02); *G06F 9/4401* (2013.01); *G06F 9/547* (2013.01); *G06F 21/44* (2013.01)

(58) Field of Classification Search
None
See application file for complete search history.

(56) References Cited

U.S. PATENT DOCUMENTS

| | | | |
|---|---|---|---|
| 10,678,600 B1* | 6/2020 | Darling | G06F 9/505 |
| 11,949,923 B1* | 4/2024 | Salian | H04N 21/47205 |
| 2021/0248205 A1* | 8/2021 | Tank | G06F 16/986 |
| 2023/0251835 A1* | 8/2023 | Manohar | G06F 8/36 717/107 |

* cited by examiner

*Primary Examiner* — Syed A Roni
(74) *Attorney, Agent, or Firm* — Foley & Lardner LLP

(57) ABSTRACT

Systems and methods for a frontend architecture that comprise a service platform that hosts a function toggle repository. The function toggle repository selects specific micro frontend fragments for specific applications. That is, the service platform may determine a particular set of functions to be performed and in turn selects the micro frontend fragments that service that function set. As the function toggle repository may select specific micro frontend fragments for specific applications at runtime and thus provide the needed governance, all new micro frontend fragments and their associated application programming interfaces (APIs) may be onboarded immediately.

18 Claims, 4 Drawing Sheets

SYSTEMS AND METHODS FOR GENERATING A COHESIVE USER EXPERIENCE USING MICRO FRONTEND FRAGMENTS WITHOUT USE OF A SHELL APPLICATION

BACKGROUND

An application shell (or "shell app") is a skeleton of a graphical user interface in the form of a basic set of static elements in Hypertext Markup Language (HTML), CSS, and JavaScript. The shell app contains only components necessary to launch an application, but content data is absent. In some cases, the shell app may be cached on a client device to provide an almost immediate launch. To provide content, shell apps typically include a frontend framework that injects other applications into the shell. For example, a frontend framework is a collection of tools and processes that aim to improve the quality of frontend code while creating a more efficient and sustainable workflow. Conventional systems use a shell app to provide these tools and processes. Additionally, conventional systems rely on the shell app to provide governance over them (e.g., for security purposes). However, this creates two technical challenges.

First, shell apps lack flexibility. For example, with the advent of Web 2.0 technologies such as HTML5, Asynchronous Javascript and XML (AJAX), and Representational State Transfer (REST) APIs, the complexities and expectations of web applications have grown manifold. While complexity and scaling come with their own technical challenges, these technical challenges are particularly exacerbated with the use of shell apps due to the static design (and predetermined content applications that may be injected into the shell app). For example, when a project is small and utilizes the same developers, integrating projects into the shell app is straightforward. However, as the number of projects and functions grow, the inflexibility of the shell app becomes a burden as different projects require different functionalities that may not be supported by the shell app. Furthermore, modifications to the shell app itself to support these new functionalities may cause support for other features and functions to become corrupted.

Second, while the shell app itself may be launched quickly (e.g., in instances where the shell app is cached on a client device), each content application and/or application providing additional features or functionality is required to do its own start-up process. Thus, creating significant time delays and user frustration as the user may see a framework of features and functions (e.g., cells in a user interface) that are either empty or non-responses to user inputs (e.g., as the underlying content application has not loaded).

SUMMARY

As an alternative to using a shell application, the methods and systems described herein are related to a novel frontend architecture that comprises a Micro Frontend (MFE) service platform that hosts a function toggle repository (e.g., a suite of services). The novel frontend architecture not only provides the required governance of a traditional shell app, but also overcomes the aforementioned technical challenges. In addition, this service platform can support multiple web applications serving a diverse set of domains and user bases.

For example, instead of using a shell app to load and unload micro frontends, this architecture allows the micro frontends to directly load on the browser thereby eliminating any delays in loading caused due to bulky shell app implementations. The MFE Service Platform may have a service called Frontend Proxy Routing Service. Frontend Proxy Routing Service may hold the top level routes and their corresponding mapping to vertical sliced micro frontends (or "Vertical MFEs"). Frontend Proxy Routing Service is also responsible to redirect and route traffic to each top level route to its respective Vertical MFEs.

When a Vertical MFE is loaded to the browser, it is bootstrapped with a light-weight process by the start-up subsystem. This process establishes a connection between the Vertical MFE and the MFE Service Platform. Once the connection is established, the MFE Service Platform is responsible for injecting the horizontal sliced micro frontends into the Vertical MFEs. Using these two mechanisms this novel micro frontend architecture is able to eliminate the need for a shell application. Also, since each Vertical MFE is completely independent and loads directly on the browser, it can define its own versions of dependencies. Developers of these Vertical MFEs have the autonomy to choose the framework and tooling of their choice to build and deploy their Vertical MFEs. They are not limited by the shell app.

Furthermore, the MFE Service Platform provides user authentication services and it also manages the user session for the web applications. When a user visits one of the Vertical MFEs, if they are not already logged in, the MFE Service Platform initiates the SSO (Single Sign On) flow. Once the user successfully completes the SSO authentication, a new user session is created for the user. The same user session is shared across all the Vertical MFEs of a Web Application. Which means the user will not be prompted to authenticate again or go through the SSO flow again when they navigate to other Vertical MFEs of the Web Application. In addition, the MFE Service Platform provides many other cross-cutting services to the Vertical MFEs. It provides reverse proxy service to proxy API calls to the API gateway. It also provides logging, monitoring and clickstream tracking services for the MFEs.

Also, instead of using a shell app to provide the required governance over the tools and processes that may be run, the methods and systems use a service platform that comprises a function toggle repository. The function toggle repository may comprise a resource area and has an organization-specific base Uniform Resource Locator ("URL") that can be used to form URLs for APIs in that resource area. A conventional shell app-based system would not require such a repository as only APIs designed for the shell app could be onboarded by the shell app. That is, in a shell app, the governance is done first, and the onboarding is done later. The service platform featuring the function toggle repository does the reverse, which allows for faster onboarding, but a greater need for governance protocols. These governance protocols are provided by the function toggle repository.

More specifically, the function toggle repository may select specific micro frontend fragments for specific applications. That is, the service platform may determine a particular set of functions to be performed and in turn select the micro frontend fragments that service that function set. For example, micro frontends are components of web application user interfaces (e.g., front ends) that are composed of semi-independent fragments that can be built by different developers using different technologies. Micro-frontend architectures resemble back-end architectures where back ends are composed of semi-independent microservices. By using the function toggle repository, the service platform may determine what micro frontend fragments, if any, are used. Thus, the function toggle repository provides an additional governance layer as well as composing micro frontend fragments into a single cohesive user experience for the end user.

Furthermore, as the function toggle repository may select specific micro frontend fragments for specific applications at runtime and thus provide the needed governance, all new micro frontend fragments and their associated APIs may be onboarded immediately. This increases flexibility, but also increases the scalability of the system. Additionally, the intermediary of the service platform allows for the selected micro frontend fragments to bootstrap their start-up process to the service platform. By doing so, the need for all of these individual micro frontends to each perform a respective start-up is not necessary. As such, these instances create significant time delays and user frustration as the user may see a framework of features and functions (e.g., cells in a user interface) that are either empty or non-responses to user inputs (e.g., as the underlying content application has not loaded).

In some aspects, systems and methods are described herein comprising receiving, at a service platform on a user device, a first request to launch a first application on the user device, wherein the service platform comprises a function toggle repository comprising a plurality of function sets, wherein each function set of the plurality of function sets comprises pre-approved application programming interfaces; retrieving, from the function toggle repository, a first function set for the first application; determining that the first function set includes a first micro frontend fragment and a second micro frontend fragment; in response to determining that the first function set includes the first micro frontend fragment and the second micro frontend fragment, executing a platform start-up procedure for the service platform, wherein the platform start-up procedure includes a first instruction to the first micro frontend fragment to bootstrap a first start-up procedure for the first micro frontend fragment to the service platform, and wherein the platform start-up procedure includes a second instruction to the second micro frontend fragment to bootstrap a second start-up procedure for the second micro frontend fragment to the service platform; and causing the first application to be generated for display in a user interface on the user device, wherein the first application comprises first content corresponding to the first micro frontend fragment and second content corresponding to the second micro frontend fragment.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a,""an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION

Figure 1:
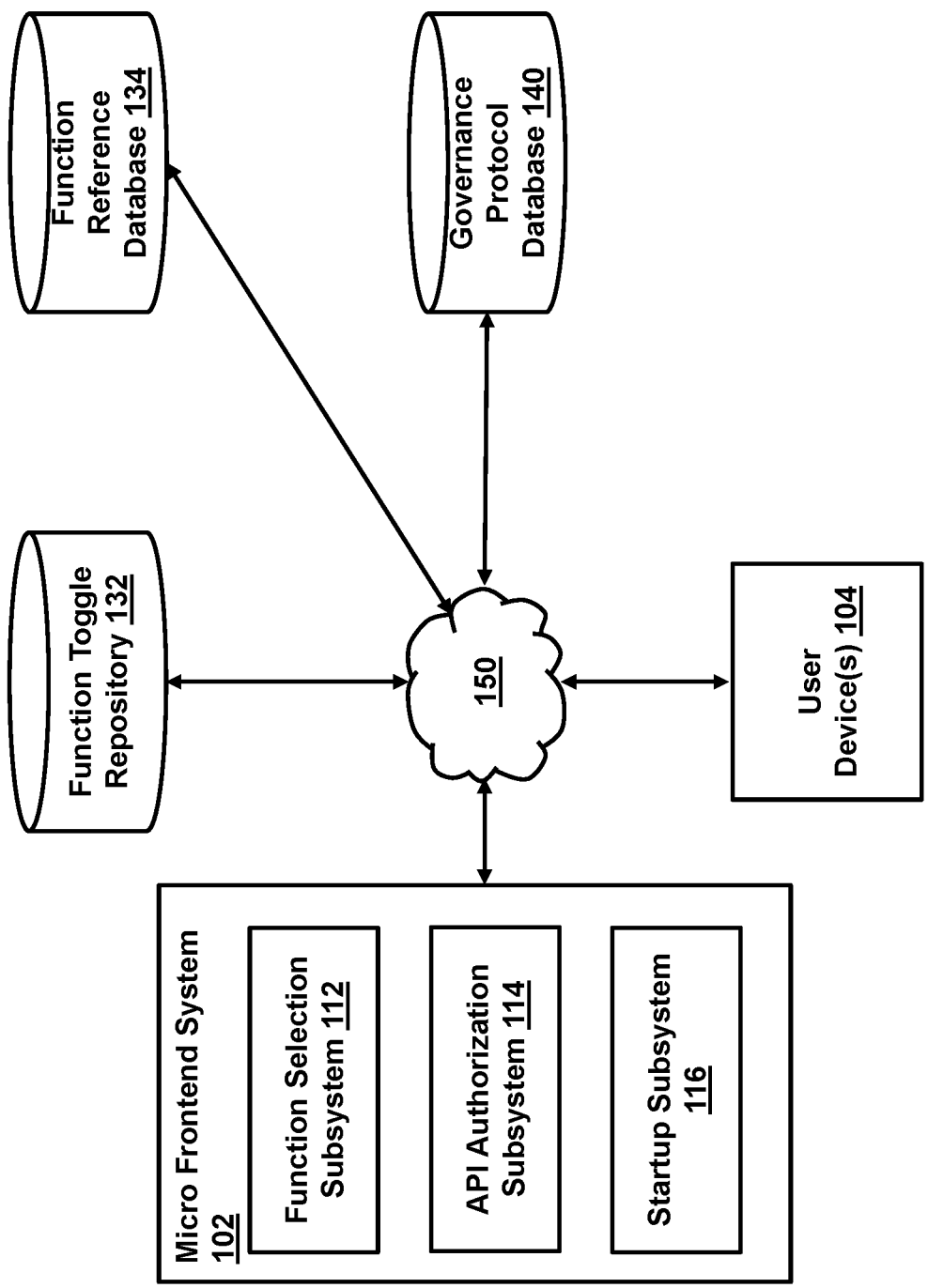
FIG. 1 shows an illustrative diagram for selecting functions and authorizing APIs, in accordance with one or more embodiments.

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

As web applications add more and more functionality, they become bloated. The development and maintenance of these applications becomes a challenge. These scaling challenges are particularly exacerbated when using a monolith single bundle application. In a micro frontend architecture, a large monolith web application is decomposed into Micro Frontend Fragments. This decomposition enables multiple teams to independently own fragments of the web applications, allowing them to simultaneously edit and deploy their fragments of the application without stepping on each other's toes. In addition, the Micro Frontend approach of building web applications enables better code organization and fault isolation and faster time to market.

When it comes to decomposing the web application into Micro Frontend Fragments there can be many approaches. These approaches can be categorized into vertical splits and horizontal splits. In a vertical split, the application is vertically sliced into micro applications. Each vertical slice is built as an SPA (Single Page Application) and is mapped to a top level path in the web application (e.g.,/search,/details,/dashboard). In horizontal split, the web applications layout is split into horizontal slices (e.g., top header section, bottom footer section, side navbar section).

Similarly, when it comes to composing the Micro Frontend Fragments back into a single cohesive web application, one possible technique is to use an Application Shell (or "shell app"). A shell app is just a skeleton of the web application. It does not contain the actual content or data rendered on the web application. It consists of the top level routes and the corresponding mapping of the vertical slice micro frontends. It contains the page layouts and templates for the horizontal slice micro frontends.

If a shell application contains the common framework and tooling dependencies that are required for the Micro Frontend Fragments, the micro frontend developers are bound to use the same framework, tooling and versions of dependencies that the shell app supports. Any changes to these common dependencies need to be updated or implemented across all Micro Frontends at the same time, which requires much coordinated effort across multiple teams.

Additionally, when a user visits the web application on a browser, the shell application is the first to load on the browser. The shell application creates the user's session and remains loaded on the browser until the end of the user's session. While the user navigates to different pages, the shell app loads and unloads the required micro frontend fragments to render the pages on the browser. As the application grows, the complexities of maintaining the top level routes, layouts, templates and corresponding micro frontend mappings gets complex. An additional drawback to shell applications is that updates to the shell app become frequent and error prone.

Systems and methods described herein may deliver content to one or more user interfaces. As referred to herein, "content" should be understood to mean an electronically consumable user asset, such as Internet content (e.g., streaming content, downloadable content, Webcasts, etc.), video clips, audio, content information, pictures, rotating images, documents, playlists, websites, articles, books, electronic books, blogs, advertisements, chat sessions, social media content, applications, games, and/or any other media or multimedia and/or combination of the same. Content may be recorded, played, displayed, or accessed by user devices, but can also be part of a live performance. Content may be provided for display on a user interface on a user device through, for example, micro frontend fragments.

As referred to herein, a "user interface" may comprise a human-computer interaction and communication in a device, and it may include display screens, keyboards, a mouse, and the appearance of a desktop. For example, a user interface may comprise a way a user interacts with an application or a website. User interfaces may occur on websites, in mobile applications, or in many software programs which may display content.

FIG. 1 shows an illustrative diagram for selecting function sets, authorizing APIs, and generating frontend content for display to the user, in accordance with one or more embodiments. For example, FIG. 1 shows Micro Frontend System 102 for selecting and enabling functions to provide content to a frontend. Micro Frontend System 102 includes Function Selection Subsystem 112, API Authorization Subsystem 114, and Startup Subsystem 116. It should be noted that as referred to herein, one or more of the components of the platform service and/or function toggle registry may be referred to collectively as the "system". The system (e.g., system 150) may include all components of Micro Frontend System 102, Function Toggle Repository 132, Function Reference Database 134, and Governance Protocol Database 140, and may communicate with one or more data sources and/or user devices 104.

Function Toggle Repository 132 includes a plurality of function sets which may be used by one or more applications. As referred to herein, a function set may comprise a plurality of functions. As described herein, a function may include any option and/or functional capability provided to a user by software and/or hardware. For example, a function may include a distinctive attribute or aspect (e.g., related to performance, portability, and/or functionality) of the software and/or hardware. For example, in some embodiments, a function may be an available feature of a program, operating system, and/or device. In some embodiments, the function may be provided as part of an application and/or may be provided as a plug-in, applet, browser extension, and/or other software component for an existing application. For example, the function may be part of an application and/or another program that may be toggled on or off. In another example, the function may be a software component that may be added and/or removed from an application.

Each feature may display particular information and/or information of a particular type. Alternatively or additionally, each function may provide a given feature. This function may be a locally performed function (e.g., a function performed on a local device) or this function may be a remotely-executed function. In some embodiments, a function may represent a link to additional information and/or other functions, which may be accessed and/or available locally or remotely. In some embodiments, the functions may be represented by textual and/or graphical information.

Function Selection Subsystem 112 may select a function set from a plurality of function sets in a function toggle repository (e.g., Function Toggle Repository 132) for an application based on its application requirements. The system may select a function set based on user preferences, device setting capabilities, function availability, consistency with one or more governance protocols, etc.

Function Selection Subsystem 112 may receive a function reference and parse the function toggle repository (e.g., Function Toggle Repository 132) using the function reference. The system may retrieve a function reference (e.g., metadata or other information that describes the feature) from Function Reference Database 134 about one or more functions (e.g., from Function Toggle Repository 132). Function Reference Database 134 includes function references which may include information about the purpose, functions, origin, system requirements (including required formats and/or capabilities), author, recommended use and/or user, related features (including features designated as complimentary, redundant, and/or incompatible) of the functions. In some embodiments, the system may allow for the injection of brand-specific assets by specifications in a function reference. For example, a brand may have a specific look and feel, and the system may select specific assets (e.g., a header, footer, font, etc.) corresponding to the brand by matching function references to those specific assets. Such information may also be stored in Function Reference Database 134.

The function reference may include a description that may be expressed in a human and/or computer readable language. The function reference may also include a reference or pointer to user profile information that may be relevant to the selection and/or use of the functions. The system may retrieve this information and/or compare it to the description in order to select and/or use the functions. For example, the description may indicate that the functions use a particular format and/or displays data in a particular language. The system may retrieve information from a user and/or device profile that indicates a device format associated with the user, a language setting associated with the user, and/or other information. The system may then determine whether or not the retrieved information corresponds to the description.

To select a function set from Function Toggle Repository 132, Function Selection Subsystem 112 may ensure that the function set complies with device capabilities of User Device(s) 104. In doing so, it may retrieve a device capability requirement based on the function reference and filter available functions in the function toggle repository based on the device capability requirement. For example, the system may access a device profile. The device profile may be stored locally on a device and/or remotely. The device profile may include information about a device. The information may be generated actively and/or passively and may include information about capabilities, processing requirements of the device, and/or device limitations (e.g., resolutions, screen size, etc.). The device profile may also include information aggregated from one or more sources (including third-party sources) such as manufacturer requirements, settings, etc.

To select a function set from Function Toggle Repository 132, Function Selection Subsystem 112 may also ensure that the function set complies with user preferences. In doing so, it may retrieve a user preference based on the function reference and filter available functions in the function toggle repository based on the user preference. For example, the system may access a user profile. The user profile may be stored locally on a user device and/or remote. The user profile may include information about a user and/or device of a user. The information may be generated by actively and/or passively monitoring actions of the user. The user profile may also include information aggregated from one or more sources (including third-party sources). The information in the user profile may include personally identifiable information about a user and may be stored in a secure and/or encrypted manner. The information in the user profile may include information about user settings and/or preferences of the user, activity of the user, demographics of the user, and/or any other information used to target a function towards a user and/or customize functions for a user.

In addition, to select a function set from Function Toggle Repository 132, Function Selection Subsystem 112 may determine a respective status of each function set of the plurality of function sets and filter the plurality of function sets based on the respective status. For example, some or all functions in a function set may be removed or replaced with an alternative function based on the current availability status of the function (e.g., if a function is currently down, then a similar function is selected). In addition, the system may determine an alternative function set for the first function set; and determine an alternative micro frontend fragment corresponding to the alternative function set. In some embodiments, the function and the alternative function are streamed as an associated pair/set to the device, and, if one of the functions (or function sets) is detected to be down, the system may use the alternative function in its place.

In addition, the system may determine an alternative function set for the first function set; and determine an alternative micro frontend fragment corresponding to the alternative function set. In some embodiments, the function and the alternative function are streamed as an associated pair/set to the device, and, if one of the functions (or function sets) is detected to be down, the system may use the alternative function in its place.

One or more components of the selected function set may utilize APIs which require authorization by the system. For example, a function set may include a first micro frontend fragment and a second micro frontend fragment. The first micro frontend fragment includes a first web application component, and the first micro frontend fragment may use a first microservice to provide first content. The second micro frontend fragment includes a second web application component, and the second micro frontend fragment may use a second microservice to provide second content. In response to determining that the first function set includes the first micro frontend fragment, the system may determine a first application programming interface (API) for the first micro frontend fragment. The system may generate a first authorization request to API Authorization subsystem 114 to authorize the first application programming interface for the first micro frontend fragment. The system may need to authorize the first API based on a governance protocol, which it may retrieve from Governance Protocol Database 140. As referred to herein, a governance protocol comprises any protocol that may dictate requirements for authorization.

The system may retrieve a first application characteristic of the first application programming interface and retrieve a first governance characteristic of the governance protocol. The system may compare the first application characteristic to the first governance characteristic. For example, the system may require a centralized approval to add a new API. This approval may be based on authorization by the governance protocol. The authorization may require determination of whether one or more characteristics of the API are consistent with the governance protocol.

API Authorization subsystem 114 may choose not to authorize an API in certain cases. For example, the system may receive a second authorization request to authorize a second application programming interface for the first micro frontend fragment. For example, the system may retrieve a governance protocol and reject the second authorization request based on the governance protocol. For example, if the system determines that a new API is inconsistent with a governance protocol, the system may generate a query. The query may request additional information, generate a notification to a user (e.g., for manual review), and/or transmit an error message.

Upon selecting a function set and approving one or more APIs corresponding to the function set, the system may perform a start-up procedure for the service platform using Startup Subsystem 116. The platform start-up procedure may include loading the first application corresponding to the platform service, and in response loading the first micro frontend fragment. For example, the system may bootstrap start-up procedures for one or more micro frontend fragments to the platform service. As such, the system may boot or load a micro frontend fragment to a device using a much smaller initial application for the micro frontend fragment contained in another application. After Startup Subsystem 116 loads the first application and the first micro frontend fragment, it may cause the first application to be generated for display in a user interface on the user device. For example, the system may detect a likelihood of use of the first content and pre-fetch the first content during start-up of the first application. For example, content for a first function (e.g., icons, brand-specific assets, graphical elements, libraries, etc.) may be pre-fetched by the system prior to a user activating a corresponding function. The system may pre-fetch this information based on information in the user profile (e.g., a user preference or setting), a predetermined or standard function selection (e.g., by the application), a previously selected feature (e.g., a feature that was present the last time the application was used), and/or a real-time determination that a user is likely to use the first function. For example, Function Toggle Repository 132 may continuously, and in real time, update information about a user. The system may continuously pre-fetch this information and/or may push this information to a local user device and/or edge server for immediate use when an application is activated. The system may also use Function Selection Subsystem 112 to re-select a function set appropriately reflective of the updated user preferences or other information. Accordingly, the system may minimize delays attributed to populating functions, functions templates, and/or providing information related to the functions.

Figure 2:
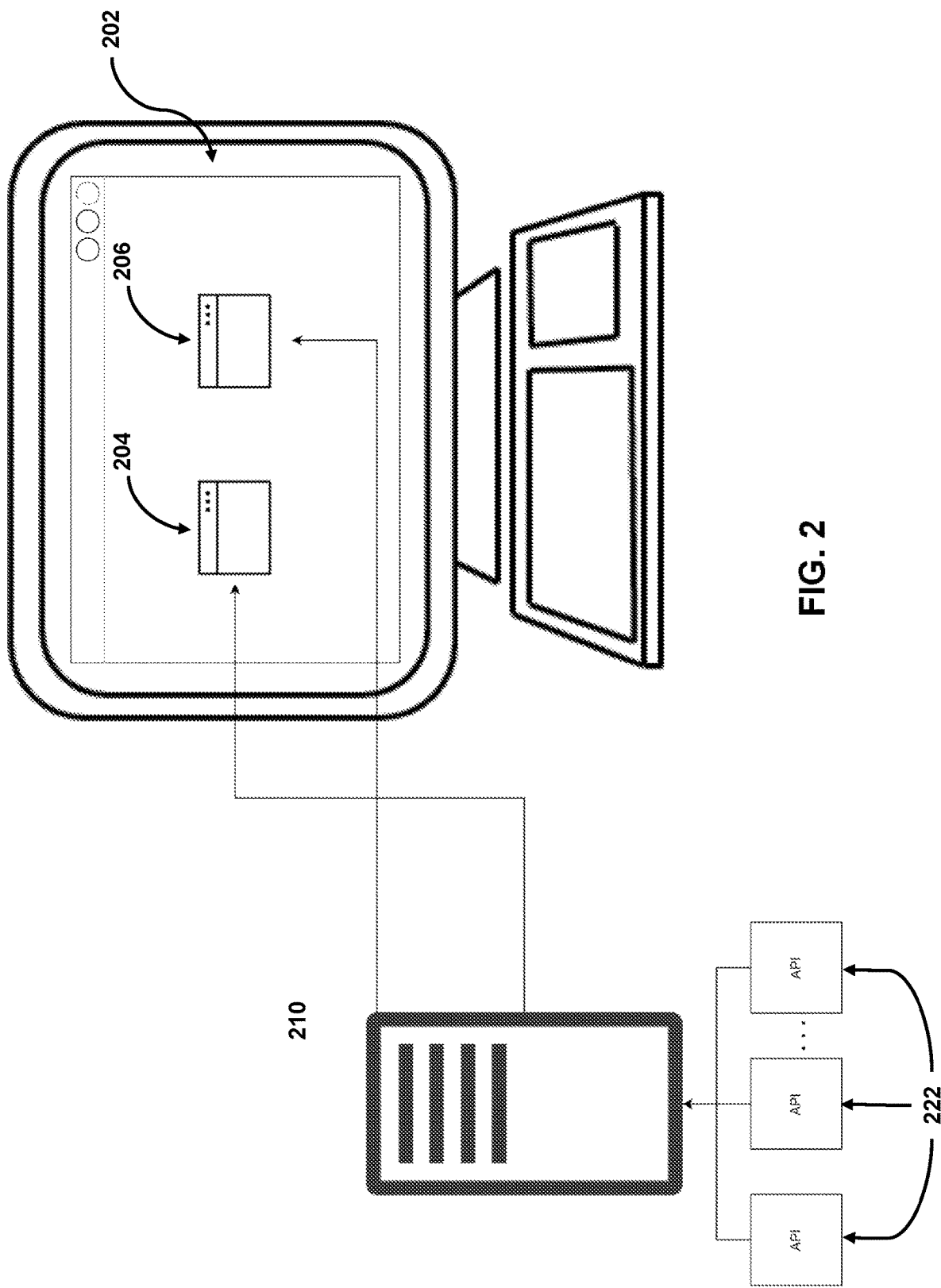
FIG. 2 shows an illustrative diagram for sending micro frontend fragments to user interfaces for display, in accordance with one or more embodiments.

FIG. 2 shows multiple components of the system enabling content to be delivered to a user interface through two micro frontend fragments. UI 202 is a user interface, in particular a webpage. It contains micro frontend fragments 204 and 206. They may, for example, display brand-specific assets like the Nike swoosh. Micro frontend fragments 204 and 206 may be selected as part of a function set. That function set may be selected from the function toggle repository and approved by component 210 as meeting user preferences and device capability requirements. In addition, that function set may be recognized as being of an operational status.

For example, a user preference may be an interactable logo on this user interface, and a device capability might be support for Cascading Style Sheets (CSS). The function set may be selected as satisfying both criteria.

The system may select additional functions in lieu of micro frontend fragments 204 and 206 in case it encounters a runtime error when the user interface loads. For example, the system may parse the function toggle repository using one or more function references to find an alternative function set. The alternative function set may accomplish the same result as micro frontend fragments 204 and 206. For example, the alternative function set may also display an interactable logo using CSS. Component 210 may send the alternative function set to user interface 202 to be activated if micro frontend fragments 204 and 206 become unavailable.

Component 210 may be a server or processor running one or more programs that embody system 150. Component 210 selects micro frontend fragments 204 and 206 for display on user interface 202 and approves corresponding APIs using a governance protocol. Because micro frontend fragments are independent pieces of software not under the control of a shell application, the system needs to determine a method of accessing them while maintaining structure in a user interface along particular guidelines. The system thus selects APIs which allow access to micro frontend fragments (e.g., micro frontend fragments 204 and 206), then approves APIs according to a governance protocol. For example, the system may select API set 222, containing one or more APIs that enable the system to load micro frontend fragments 204 and 206, and APIs that load the alternative function set. The system may compare API set 222 against a governance protocol (e.g., each API has a valid descriptor document, supports create, read, update, and delete functionalities, etc.) to approve one or more APIs. By using one or more APIs in API set 222, the system may bootstrap micro frontend fragments (e.g., micro frontend fragments 204 and 206). The system may pre-fetch one or more micro frontend fragments for faster start-up.

Figure 3:
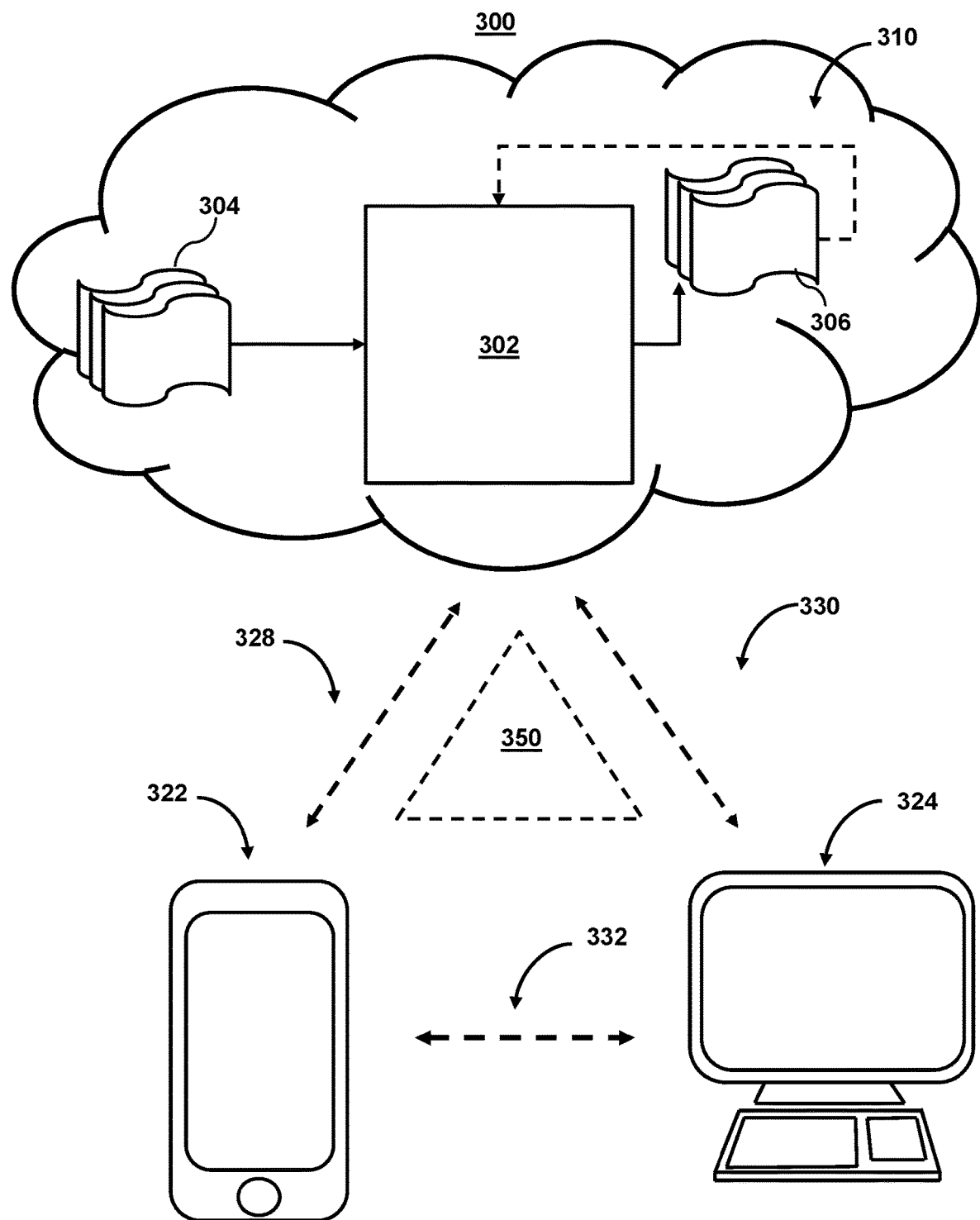
FIG. 3 shows illustrative components for a system used to communicate between selection and authorization systems and data sources, in accordance with one or more embodiments.

FIG. 3 shows illustrative components for a system used to select function sets and/or approve APIs, in accordance with one or more embodiments. For example, FIG. 3 may show illustrative components for sending micro frontend fragments to user interfaces. As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a hand-held computer, and other computer equipment (e.g., a server), including "smart," wireless, wearable, and/or mobile devices. FIG. 3 also includes cloud components 310. Cloud components 310 may alternatively be any computing device as described above, and may include any type of mobile terminal, fixed terminal, or other device. For example, cloud components 310 may be implemented as a cloud computing system and may feature one or more component devices. It should also be noted that system 300 is not limited to three devices. Users may, for instance, utilize one or more devices to interact with one another, one or more servers, or other components of system 300. It should be noted, that, while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., conversational response, queries, and/or notifications).

Additionally, as mobile device 322 and user terminal 324 are shown as touchscreen smartphones, these displays also act as user input interfaces. It should be noted that in some embodiments, the devices may have neither user input interfaces nor displays, and may instead receive and display content using another device (e.g., a dedicated display device such as a computer screen, and/or a dedicated input device such as a remote control, mouse, voice input, etc.). Additionally, the devices in system 300 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may include Micro Frontend System 102, and may access Function Toggle Repository 132, Function Reference 134, Governance Protocol Database 140, and User Device(s) 104. Cloud components 310 may also include component 210, which may approve API set 222 and send content to user interface 202.

Cloud components 310 may include model 302, which may be a machine learning model, artificial intelligence model, etc. (which may be referred to collectively as "models" herein). Model 302 may take inputs 304 and provide outputs 306. The inputs may include multiple datasets, such as a training dataset and a test dataset. Each of the plurality of datasets (e.g., inputs 304) may include data subsets related to user data, predicted forecasts and/or errors, and/or actual forecasts and/or errors. In some embodiments, outputs 306 may be fed back to model 302 as input to train model 302 (e.g., alone or in conjunction with user indications of the accuracy of outputs 306, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., whether an application characteristic meets a governance characteristic).

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback.

In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem-solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, backpropagation techniques may be utilized by model 302 where forward stimulation is used to reset weights on the "front" neural units. In some embodiments, stimulation and inhibition for model 302 may be more free-flowing with connections interacting in a more chaotic and complex fashion. During testing, an output layer of model 302 may indicate whether or not a given input corresponds to a classification of model 302 (e.g., whether an application characteristic meets a governance characteristic).

In some embodiments, the model (e.g., model 302) may automatically perform actions based on outputs 306. In some embodiments, the model (e.g., model 302) may not perform any actions. The output of the model (e.g., model 302) may be used to determine whether an application characteristic meets a governance characteristic.

System 300 also includes API layer 350. API layer 350 may allow the system to generate summaries across different devices. In some embodiments, API layer 350 may be implemented on User Device 322 or user terminal 324. Alternatively or additionally, API layer 350 may reside on one or more of cloud components 310. API layer 350 (which may be A REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful Web services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Frontend Layer and Back-End Layer where microservices reside. In this kind of architecture, the role of the API layer 350 may provide integration between Front-End and Back-End. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API Platforms and their modules. API layer 350 may use a developer portal. API layer 350 may use strong security constraints applying WAF and DDoS protection, and API layer 350 may use RESTful APIs as standard for external integration.

Figure 4:
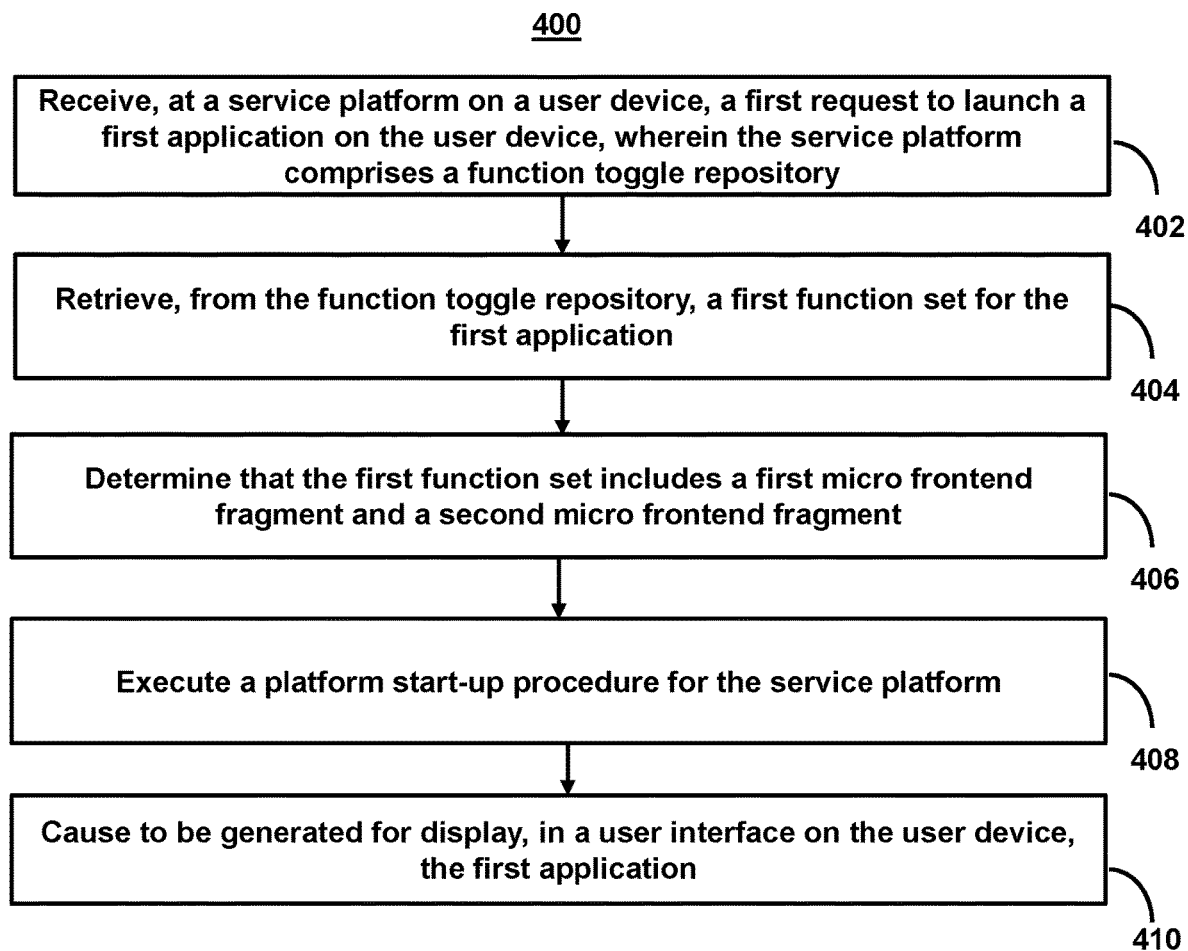
FIG. 4 shows a flowchart of the steps involved in selecting and displaying content without a shell application, in accordance with one or more embodiments.

FIG. 4 shows a flowchart of the steps involved in selecting function sets and approving corresponding APIs, in accordance with one or more embodiments. For example, the system may use process 400 (e.g., as implemented on one or more system components described above) in order to display content in a user interface in a micro frontend framework without reference to shell applications.

At step 402, process 400 (e.g., using one or more components described above) receives, at a service platform on a user device, a first request to launch a first application on the user device. The service platform includes a function toggle repository, which includes a plurality of function sets. Each function set of the plurality of function sets contains pre-approved application programming interfaces. As referred to herein, a function set may comprise a plurality of functions. As described herein, a function may include any option and/or functional capability provided to a user by software and/or hardware. Specifically, the service platform may use the function sets in the function toggle repository to support content sent to the application (e.g., through the use of micro frontend fragments). The service platform may use the steps described below to execute actions such as selecting a function set from a function toggle repository, identifying APIs corresponding to the function set, and causing display of content in the first application corresponding to the function set. The service platform may use, for example, Micro Frontend System 102 and Component 210 to do so.

At step 404, process 400 (e.g., using one or more components described above) retrieves, from the function toggle repository, a first function set for the first application. The system may determine an application requirement for the first application and select the first function set from a plurality of function sets based on the application requirement. For example, the system may select a function set (e.g., using Function Selection Subsystem 112) based on user preferences, device setting capabilities, function availability, consistency with one or more governance protocols, etc. In some embodiments, the system may allow for the injection of brand-specific assets. For example, a brand may have a specific look and feel, and the system may select specific assets (e.g., a header, footer, font, etc.) corresponding to the brand. In some embodiments, the function sets and/or function(s) available in the function toggle repository may continuously change as new functions and/or governance protocols are added. To do so, the system may determine a requirement of the application and select a function (or function set) that meets the requirement.

To select the first function set from a plurality of function sets, the system may determine a respective status of each function set of the plurality of function sets and filter the plurality of function sets based on the respective status. For example, some or all functions in a function set may be removed or replaced with an alternative function based on the current availability status of the function (e.g., if a function is currently down, then a similar function is selected).

In addition, the system may determine an alternative function set for the first function set; and determine an alternative micro frontend fragment corresponding to the alternative function set. In some embodiments, the function and the alternative function are streamed as an associated pair/set to the device, and, if one of the functions (or function sets) is detected to be down, the system may use the alternative function in its place.

In order to select the first function set from a plurality of function sets, the system may retrieve the first function set for the first application from the function toggle repository (e.g., Function Toggle Repository 132). For example, the system may receive a function reference (e.g., from Function Reference Database 134) and parse the function toggle repository using the function reference. The system may include a function reference (e.g., metadata or other information that describes the feature) about one or more functions. For example, the function reference may include information about the purpose, functions, origin, system requirements (including required formats and/or capabilities), author, recommended use and/or user, related features (including features designated as complementary, redundant, and/or incompatible) of the functions. The function reference may include a description that may be expressed in a human and/or computer readable language. The function reference may also include a reference or pointer to user profile information that may be relevant to the selection and/or use of the functions. The system may retrieve this information and/or compare it to the description in order to select and/or use the functions. For example, the description may indicate that the functions use a particular format and/or display data in a particular language. The system may retrieve information from a user and/or device profile that indicates a device format associated with the user, a language setting associated with the user, and/or other information. The system may then determine whether or not the retrieved information corresponds to the description.

Parsing the function toggle repository using the function reference may include retrieving a device capability requirement based on the function reference, and filtering available functions in the function toggle repository based on the device capability requirement. For example, the system may access a device profile. The device profile may be stored locally on a device and/or remotely. The device profile may include information about a device. The information may be generated actively and/or passively and may include information about capabilities, processing requirements of the device, and/or device limitations (e.g., resolutions, screen size, etc.). The device profile may also include information aggregated from one or more sources (including third-party sources) such as manufacturer requirements, settings, etc.

Parsing the function toggle repository using the function reference may include retrieving a user preference based on the function reference and filtering available functions in the function toggle repository based on the user preference. For example, the system may access a user profile. The user profile may be stored locally on a user device and/or remote. The user profile may include information about a user and/or device of a user. The information may be generated by actively and/or passively monitoring actions of the user. The user profile may also include information aggregated from one or more sources (including third-party sources). The information in the user profile may include personally identifiable information about a user and may be stored in a secure and/or encrypted manner. The information in the user profile may include information about user settings and/or preferences of the user, activity of the user, demographics of the user, and/or any other information used to target a function towards a user and/or customize functions for a user.

At step 406, process 400 (e.g., using one or more components described above) determines that the first function set includes a first micro frontend fragment and a second micro frontend fragment. Examples of micro frontend fragments are described in FIG. 2, as micro frontend fragments 204 and 206. The first micro frontend fragment includes a first web application component, and the first micro frontend fragment may use a first microservice to provide first content. The second micro frontend fragment includes a second web application component, and the second micro frontend fragment may use a second microservice to provide second content. In response to determining that the first function set includes the first micro frontend fragment, the system may determine a first application programming interface (API) for the first micro frontend fragment. In response to determining the first application programming interface for the first micro frontend fragment, the system may generate a first authorization request to authorize a first application programming interface for the first micro frontend fragment. For example, conventional systems that rely on a shell app would require pre-authorization of any API used by a micro frontend fragment. These conventional systems would require this because the shell app would need to inject the code of the API into the shell app at runtime. If there is a new (e.g., unauthorized) API, the shell app could not process the new API. That is, in a shell app the governance is performed first, and the onboarding later. The system allows this process to be done in reverse, and by doing so achieve faster onboarding and greater flexibility.

The system may receive a first authorization request to authorize a first application programming interface for the first micro frontend fragment. The system may retrieve a governance protocol (e.g., from Governance Protocol Database 140) and authorize the first API based on the governance protocol. In some embodiments, the lack of a shell application makes governance more difficult. The system may deal with the increased difficulty in governance through the use of a frontend proxy and a URL source resource board that execute a governance protocol. As referred to herein, a governance protocol comprises any protocol that may dictate requirements for authorization. The system may retrieve a governance protocol and authorize the first application programming interface based on the governance protocol.

For example, authorizing the first application programming interface based on the governance protocol may include retrieving a first application characteristic of the first application programming interface and retrieving a first governance characteristic of the governance protocol. The system may compare the first application characteristic to the first governance characteristic. For example, the system may require a centralized approval to add a new API. This approval may be based on authorization by the governance protocol. The authorization may require determination of whether one or more characteristics of the API are consistent with the governance protocol.

The system may receive a second authorization request to authorize a second application programming interface for the first micro frontend fragment. For example, the system may retrieve a governance protocol and reject the second authorization request based on the governance protocol. For example, if the system determines that a new API is inconsistent with a governance protocol, the system may generate a query. The query may request additional information, generate a notification to a user (e.g., for manual review), and/or transmit an error message.

At step 408, process 400 (e.g., using one or more components described above) executes a platform start-up procedure for the service platform. In some embodiments, the platform start-up procedure includes loading the first application corresponding to the platform service, and in response loading the first micro frontend fragment. For example, the system may bootstrap start-up procedures for one or more micro frontend fragments to the platform service. As such, the system may boot or load a micro frontend fragment to a device using a much smaller initial application for the micro frontend fragment contained in another application. By doing so, the system may reduce overall load time.

At step 410, process 400 (e.g., using one or more components described above) causes the first application to be generated for display in a user interface on the user device. For example, the system may detect a likelihood of use of the first content and pre-fetch the first content during start-up of the first application. For example, content for a first function (e.g., icons, graphical elements, libraries, etc.) may be pre-fetched by the system prior to a user activating a corresponding function. The system may pre-fetch this information based on information in the user profile (e.g., a user preference or setting), a predetermined or standard function selection (e.g., by the application), a previously selected feature (e.g., a feature that was present the last time the application was used), and/or a real-time determination that a user is likely to use the first function. For example, the function toggle repository may continuously, and in real time, update information about a user. The system may continuously pre-fetch this information and/or may push this information to a local user device and/or edge server for immediate use when an application is activated. Accordingly, the system may minimize delays attributed to populating functions, functions templates, and/or providing information related to the functions.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method, the method comprising receiving, at a service platform on a user device, a first request to launch a first application on the user device, wherein the service platform comprises a function toggle repository comprising a plurality of function sets, wherein each function set of the plurality of function sets comprises pre-approved application programming interfaces; retrieving, from the function toggle repository, a first function set for the first application; determining that the first function set includes a first micro frontend fragment and a second micro frontend fragment; in response to determining that the first function set includes the first micro frontend fragment and the second micro frontend fragment, executing a platform start-up procedure for the service platform, wherein the platform start-up procedure includes a first instruction to the first micro frontend fragment to bootstrap a first start-up procedure for the first micro frontend fragment to the service platform, and wherein the platform start-up procedure includes a second instruction to the second micro frontend fragment to bootstrap a second start-up procedure for the second micro frontend fragment to the service platform; and causing the first application to be generated for display in a user interface on the user device, wherein the first application comprises first content corresponding to the first micro frontend fragment and second content corresponding to the second micro frontend fragment.
2. The method of any one of the preceding embodiments, further comprising: in response to determining that the first function set includes the first micro frontend fragment, determining a first application programming interface for the first micro frontend fragment; and in response to determining the first application programming interface for the first micro frontend fragment, generating a first authorization request to authorize a first application programming interface for the first micro frontend fragment.
3. The method of any one of the preceding embodiments, further comprising: receiving a first authorization request to authorize a first application programming interface for the first micro frontend fragment; retrieving a governance protocol; and authorizing the first application programming interface based on the governance protocol.
4. The method of any one of the preceding embodiments, wherein authorizing the first application programming interface based on the governance protocol further comprises: retrieving a first application characteristic of the first application programming interface; retrieving a first governance characteristic of the governance protocol; and comparing the first application characteristic to the first governance characteristic.
5. The method of any one of the preceding embodiments, wherein authorizing the first application programming interface based on the governance protocol further comprises: receiving a second authorization request to authorize a second application programming interface for the first micro frontend fragment; retrieving a governance protocol; and rejecting the second authorization request based on the governance protocol.
6. The method of any one of the preceding embodiments, wherein retrieving the first function set for the first application comprises: receiving a function reference; and parsing the function toggle repository using the function reference.
7. The method of any one of the preceding embodiments, wherein parsing the function toggle repository using the function reference comprises: retrieving a device capability requirement based on the function reference; and filtering available functions in the function toggle repository based on the device capability requirement.
8. The method of any one of the preceding embodiments, wherein parsing the function toggle repository using the function reference comprises: retrieving a user preference based on the function reference; and filtering available functions in the function toggle repository based on the user preference.
9. The method of any one of the preceding embodiments, wherein causing the first application to be generated for display further comprises: detecting a likelihood of use of the first content; and pre-fetching the first content during start-up of the first application.
10. The method of any one of the preceding embodiments, wherein the platform start-up procedure comprises: loading the first application corresponding to the platform service; and in response to loading the first application, loading the first micro frontend fragment.
11. The method of any one of the preceding embodiments, further comprising: determining an application requirement for the first application; and selecting the first function set from a plurality of function sets based on the application requirement.
12. The method of any one of the preceding embodiments, wherein selecting the first function set from the plurality of function sets further comprises: determining a respective status of each function set of the plurality of function sets; and filtering the plurality of function sets based on the respective status.
13. The method of any one of the preceding embodiments, wherein selecting the first function set from the plurality of function sets further comprises: determining an alternative function set for the first function set; and determining an alternative micro frontend fragment corresponding to the alternative function set.
14. A tangible, non-transitory, machine-readable medium storing instructions that, when executed by a data processing apparatus, causes the data processing apparatus to perform operations comprising those of any of embodiments 1-13.
15. A system comprising one or more processors; and memory storing instructions that, when executed by the processors, cause the processors to effectuate operations comprising those of any of embodiments 1-13.
16. A system comprising means for performing any of embodiments 1-13.

What is claimed is:
1. A system for generating a cohesive user experience using micro frontend fragments without using a shell application, the system comprising:
a first micro frontend fragment, wherein the first micro frontend fragment comprises a first web application component, and wherein the first micro frontend fragment uses a first microservice to provide first content;
a second micro frontend fragment, wherein the second micro frontend fragment comprises a second web application component, and wherein the second micro frontend fragment uses a second microservice to provide second content; and
a service platform, wherein the service platform comprises a function toggle repository comprising a plurality of function sets, wherein each function set of the plurality of function sets comprises pre-approved application programming interfaces, wherein the service platform comprises memory storing instructions and at least one hardware processor to execute the instructions to perform operations comprising:
receiving a first request to launch a first application on a user device, wherein the first application comprises application software that runs in a web browser;
retrieving, from the function toggle repository, a first function set for the first application;

determining that the first function set includes the first micro frontend fragment and the second micro frontend fragment;

in response to determining that the first function set includes the first micro frontend fragment, determining a first application programming interface for the first micro frontend fragment;

in response to determining the first application programming interface for the first micro frontend fragment, generating a first authorization request to authorize the first application programming interface for the first micro frontend fragment;

executing a platform start-up procedure for the service platform, wherein the platform start-up procedure includes a first instruction to the first micro frontend fragment to bootstrap a first start-up procedure for the first micro frontend fragment to the service platform, and wherein the platform start-up procedure includes a second instruction to the second micro frontend fragment to bootstrap a second start-up procedure for the second micro frontend fragment to the service platform; and causing the first application to be generated for display in a user interface on the user device, wherein the first application comprises the first content corresponding to the first micro frontend fragment and the second content corresponding to the second micro frontend fragment.

2. A method for generating a cohesive user experience using micro frontend fragments, the method comprising:

receiving, at a service platform on a user device, a first request to launch a first application on the user device, wherein the service platform comprises a function toggle repository comprising a plurality of function sets, wherein each function set of the plurality of function sets comprises pre-approved application programming interfaces;

retrieving, from the function toggle repository, a first function set for the first application;

determining that the first function set includes a first micro frontend fragment and a second micro frontend fragment;

in response to determining that the first function set includes the first micro frontend fragment, determining a first application programming interface for the first micro frontend fragment;

in response to determining the first application programming interface for the first micro frontend fragment, generating a first authorization request to authorize the first application programming interface for the first micro frontend fragment;

executing a platform start-up procedure for the service platform, wherein the platform start-up procedure includes a first instruction to the first micro frontend fragment to bootstrap a first start-up procedure for the first micro frontend fragment to the service platform, and wherein the platform start-up procedure includes a second instruction to the second micro frontend fragment to bootstrap a second start-up procedure for the second micro frontend fragment to the service platform; and causing the first application to be generated for display in a user interface on the user device, wherein the first application comprises first content corresponding to the first micro frontend fragment and second content corresponding to the second micro frontend fragment.

3. The method of claim 2, further comprising:

receiving the first authorization request to authorize the first application programming interface for the first micro frontend fragment;

retrieving a governance protocol; and authorizing the first application programming interface based on the governance protocol.

4. The method of claim 3, wherein authorizing the first application programming interface based on the governance protocol further comprises:

retrieving a first application characteristic of the first application programming interface;

retrieving a first governance characteristic of the governance protocol; and comparing the first application characteristic to the first governance characteristic.

5. The method of claim 3, wherein authorizing the first application programming interface based on the governance protocol further comprises:

receiving a second authorization request to authorize a second application programming interface for the first micro frontend fragment;

retrieving a governance protocol; and rejecting the second authorization request based on the governance protocol.

6. The method of claim 2, wherein retrieving the first function set for the first application comprises:

receiving a function reference; and parsing the function toggle repository using the function reference.

7. The method of claim 6, wherein parsing the function toggle repository using the function reference comprises:

retrieving a device capability requirement based on the function reference; and filtering available functions in the function toggle repository based on the device capability requirement.

8. The method of claim 6, wherein parsing the function toggle repository using the function reference comprises:

retrieving a user preference based on the function reference; and filtering available functions in the function toggle repository based on the user preference.

9. The method of claim 2, wherein causing the first application to be generated for display further comprises:

detecting a likelihood of use of the first content; and pre-fetching the first content during start-up of the first application.

10. The method of claim 2, wherein the platform start-up procedure comprises:

loading the first application corresponding to the platform service platform; and in response to loading the first application, loading the first micro frontend fragment.

11. The method of claim 2, further comprising:

determining an application requirement for the first application; and selecting the first function set from the plurality of function sets based on the application requirement.

12. The method of claim 11, wherein selecting the first function set from the plurality of function sets further comprises:

determining a respective status of each function set of the plurality of function sets; and filtering the plurality of function sets based on the respective status.

13. The method of claim 11, wherein selecting the first function set from the plurality of function sets further comprises:

determining an alternative function set for the first function set; and determining an alternative micro frontend fragment corresponding to the alternative function set.

14. A non-transitory, computer readable medium having instructions recorded thereon that when executed by one or more processors cause operations comprising:

receiving, at a service platform on a user device, a first request to launch a first application on the user device, wherein the service platform comprises a function toggle repository comprising a plurality of function sets, wherein each function set of the plurality of function sets comprises pre-approved application programming interfaces;

retrieving, from the function toggle repository, a first function set for the first application;

determining that the first function set includes a first micro frontend fragment and a second micro frontend fragment;

in response to determining that the first function set includes the first micro frontend fragment, determining a first application programming interface for the first micro frontend fragment;

in response to determining the first application programming interface for the first micro frontend fragment, generating a first authorization request to authorize the first application programming interface for the first micro frontend fragment;

executing a platform start-up procedure for the service platform, wherein the platform start-up procedure includes a first instruction to the first micro frontend fragment to bootstrap a first start-up procedure for the first micro frontend fragment to the service platform, and wherein the platform start-up procedure includes a second instruction to the second micro frontend fragment to bootstrap a second start-up procedure for the second micro frontend fragment to the service platform; and causing the first application to be generated for display in a user interface on the user device, wherein the first application comprises first content corresponding to the first micro frontend fragment and second content corresponding to the second micro frontend fragment.

15. The non-transitory, computer readable medium of claim 14, wherein the instructions further cause operations comprising:

receiving the first authorization request to authorize the first application programming interface for the first micro frontend fragment;

retrieving a governance protocol; and authorizing the first application programming interface based on the governance protocol.

16. The non-transitory, computer readable medium of claim 15, wherein authorizing the first application programming interface based on the governance protocol further comprises:

retrieving a first application characteristic of the first application programming interface;

retrieving a first governance characteristic of the governance protocol; and comparing the first application characteristic to the first governance characteristic.

17. The non-transitory, computer readable medium of claim 15, wherein authorizing the first application programming interface based on the governance protocol further comprises:

receiving a second authorization request to authorize a second application programming interface for the first micro frontend fragment;

retrieving a governance protocol; and rejecting the second authorization request based on the governance protocol.

18. The non-transitory, computer readable medium of claim 14, wherein retrieving the first function set for the first application comprises:

receiving a function reference; and parsing the function toggle repository using the function reference.

* * * * *